US012436550B2

(12) United States Patent
Lee

(10) Patent No.: US 12,436,550 B2
(45) Date of Patent: Oct. 7, 2025

(54) VOLTAGE REGULATOR WITH CONTROL OF THE FEEDBACK VOLTAGE DIVIDER

(71) Applicant: SK hynix Inc., Icheon-si (KR)

(72) Inventor: Jung Han Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 244 days.

(21) Appl. No.: 18/334,983

(22) Filed: Jun. 14, 2023

(65) Prior Publication Data

US 2024/0176372 A1 May 30, 2024

(30) Foreign Application Priority Data

Nov. 29, 2022 (KR) ........................ 10-2022-0162145

(51) Int. Cl.
*G05F 1/46* (2006.01)
*G05F 1/575* (2006.01)

(52) U.S. Cl.
CPC .............. *G05F 1/462* (2013.01); *G05F 1/575* (2013.01)

(58) Field of Classification Search
CPC ................................. G05F 1/462; G05F 1/575
See application file for complete search history.

(56) References Cited

U.S. PATENT DOCUMENTS 3,745,363 A * 7/1973 Fendrich, Jr. ........... G05F 1/585 323/268
7,619,402 B1 * 11/2009 Kwong .................. G05F 1/575 323/369
9,411,348 B2 * 8/2016 Iacob ...................... G05F 1/575
9,983,605 B2 5/2018 Duong et al.
11,082,047 B2 8/2021 Zhan et al.
2015/0102789 A1 * 4/2015 Kobayashi ................ G05F 1/56 323/271
2019/0033902 A1 * 1/2019 Enjalbert ................ G05F 1/575
2021/0333812 A1 * 10/2021 Liu ........................ G05F 1/462

FOREIGN PATENT DOCUMENTS

KR 102317348 B1 10/2021

* cited by examiner

*Primary Examiner* — Harry R Behm
(74) *Attorney, Agent, or Firm* — WILLIAM PARK AND ASSOCIATES LTD.

(57) ABSTRACT

A voltage regulator includes a voltage generator configured to receive a reference voltage and a feedback voltage and configured to generate an output voltage corresponding to the feedback voltage, a voltage divider configured to divide the output voltage to generate the feedback voltage, and a controller configured to control a voltage division value of the voltage divider in response to a program enable signal and a charge-pump enable signal during an activation period of an enable signal.

19 Claims, 8 Drawing Sheets

VOLTAGE REGULATOR WITH CONTROL OF THE FEEDBACK VOLTAGE DIVIDER

CROSS-REFERENCE TO RELATED APPLICATION

This application claims the priority under 35 U.S.C. § 119(a) to Korean patent application No. 10-2022-0162145, filed on Nov. 29, 2022, in the Korean Intellectual Property Office, which is hereby incorporated by reference in its entirety as part of the disclosure of this patent document.

TECHNICAL FIELD

The technology and implementations disclosed in this patent document generally relate to a low dropout (LDO) regulator.

BACKGROUND

Recently, with the trend of diversification and miniaturization of devices, efforts for integrating various circuits into a single chip to implement a System-On-Chip (SOC) are rapidly increasing. In this way, as various circuits are integrated into one chip, the demand for efficient and stable power-supply voltage management systems is also rapidly increasing.

A low dropout (LDO) regulator is one of essential elements in a power-supply voltage management system, and is used to supply a stable voltage to internal circuits. Since a change in the voltage supplied to these internal circuits can greatly affect malfunction of the internal circuits, it is important for the low dropout (LDO) regulator to provide a stable voltage to the internal circuits.

SUMMARY

In accordance with an embodiment of the disclosed technology, a voltage regulator may include a voltage generator configured to receive a reference voltage and a feedback voltage and configured to generate an output voltage corresponding to the feedback voltage; a voltage divider configured to divide the output voltage to generate the feedback voltage; and a controller configured to control a voltage division value of the voltage divider in response to a program enable signal and a charge-pump enable signal during an activation period of an enable signal.

In accordance with another embodiment of the disclosed technology, a voltage regulator may include a voltage generator configured to receive a reference voltage and a feedback voltage and configured to generate an output voltage corresponding to the feedback voltage; a voltage divider configured to divide the output voltage to generate the feedback voltage; and a controller configured to control a voltage division value of the voltage divider in response to a program enable signal and a charge-pump enable signal during an activation period of an enable signal, wherein the feedback voltage is changed according to the voltage division value so that the output voltage increases to a predetermined target level or higher during a first period and then sequentially decreases during a second period after the first period lapses.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
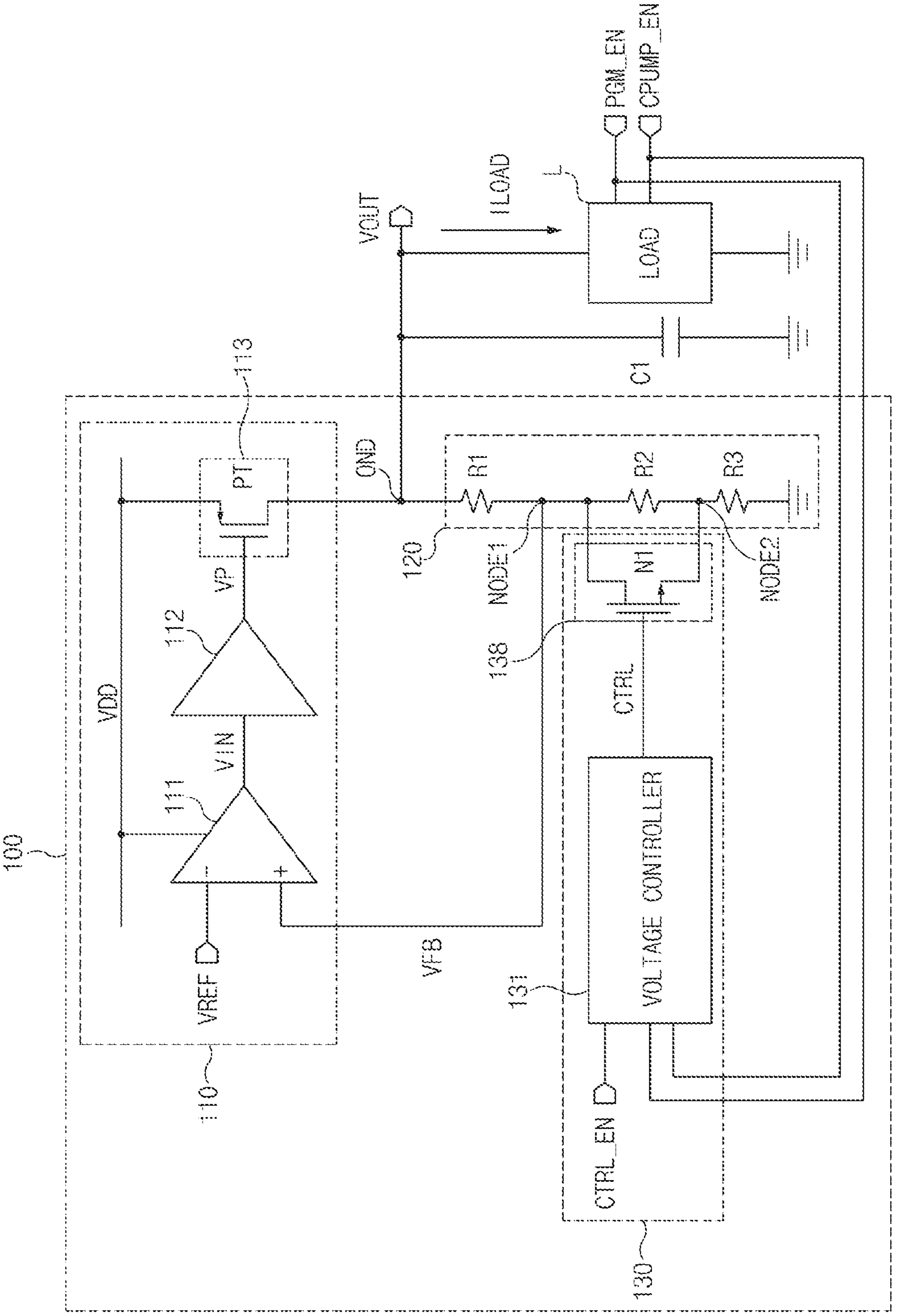
FIG. 1 is a circuit diagram illustrating an example of a voltage regulator based on some implementations of the disclosed technology.

This patent document provides implementations and examples of a low dropout (LDO) regulator that may be used in configurations to substantially address one or more technical or engineering issues and to mitigate limitations or disadvantages encountered in some other image sensing devices. Some implementations of the disclosed technology relate to a voltage regulator capable of effectively preventing an undershoot phenomenon of an output voltage. In recognition of the issues above, the disclosed technology can prevent an undershoot phenomenon from occurring in an output stage of the voltage regulator, thereby preventing malfunction of a load circuit located at a rear stage of the voltage regulator.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to a voltage regulator capable of effectively preventing an undershoot phenomenon of an output voltage.

It is to be understood that both the foregoing general description and the following detailed description of the disclosed technology are illustrative and explanatory and are intended to provide further explanation of the disclosure as claimed.

FIG. 1 is a circuit diagram illustrating an example of a voltage regulator based on some implementations of the disclosed technology.

Referring to FIG. 1, the voltage regulator 100 may include a voltage generator 110, a voltage divider 120, and a controller 130.

The voltage generator 110 may receive a reference voltage VREF and a feedback voltage VFB and may thus generate an output voltage VOUT corresponding to the feedback voltage VFB. Here, the voltage generator 110 may include an amplifier 111, a buffer 112, and a driver 113.

The amplifier 111 may compare the reference voltage VREF with the feedback voltage VFB by using the power-supply voltage VDD as an operation voltage, may amplify a voltage based on the difference between the reference voltage VREF and the feedback voltage VFB, and may output the amplified voltage VIN to a buffer 112. For example, the amplifier 111 may be implemented as an operational amplifier (OP-AMP). For example, the reference voltage VREF may be input to a negative (−) terminal of the amplifier 111, and the feedback voltage VFB may be input to a positive (+) terminal of the amplifier 111. In this case, the voltage VIN, which is an output voltage of the amplifier 111, may decrease or increase in response to the feedback voltage VFB. For example, the amplifier 111 may output a high-level voltage VIN when the feedback voltage VFB is higher than the reference voltage VREF and may output a low-level voltage VIN when the feedback voltage VFB is lower than the reference voltage VREF.

The buffer 112 may control a driver 113 in response to the voltage VIN that is an output voltage of the amplifier 111. For example, the buffer 112 may supply the driver 113 with a driving voltage VP proportional to the voltage VIN that is an output voltage of the amplifier 111.

The driver 113 may adjust an output voltage VOUT of an output terminal OND to a power-supply voltage VDD in response to an output voltage (i.e., a driving voltage VP) of the buffer 112. The driver 113 may include a pass transistor PT. The pass transistor PT may be implemented as a PMOS transistor. The pass transistor PT may be coupled between the output terminal OND of the voltage regulator 100 and a power-supply voltage VDD input terminal and may thus receive the driving voltage VP through a gate terminal thereof. The driving current flowing through the pass transistor PT may be adjusted by the driving voltage VP that is applied to the gate terminal of the pass transistor PT so that the difference between the output voltage VOUT and the reference voltage VREF may be reduced and the output voltage VOUT may be kept constant.

In addition, the voltage divider 120 may generate a feedback voltage VFB in response to the output voltage VOUT of the output terminal OND. The voltage divided by the voltage divider 120 may be supplied to the amplifier 111 as a feedback voltage VFB. The voltage divider 120 may generate a feedback voltage VFB through distribution (or division) of the output voltage VOUT. In this case, a voltage division value of the output voltage VOUT may be changed in response to the output of the controller 130 so that a level of the feedback voltage may be adjusted.

The voltage divider 120 may include a plurality of resistors R1, R2, and R3 connected in series between the output terminal OND and a ground voltage terminal. In this case, the resistor R1 may be connected between the output terminal OND and a node NODE1. The resistor R2 may be connected between a node NODE1 and a node NODE2. The resistor R3 may be connected between the node NODE2 and the ground voltage terminal. The voltage divider 120 may generate a feedback voltage VFB by dividing the output voltage VOUT by the plurality of resistors R1, R2, and R3.

Although the embodiment of FIG. 1 has disclosed that the number of resistors R1, R2, and R3 is set to 3, this is merely for convenience of description, and other implementations are possible, noting that the number of resistors can also be sufficiently changed as necessary.

The controller 130 may adjust the voltage division value of the voltage divider 120 in response to a program enable signal PGM_EN and a charge-pump enable signal CPUMP_EN during an activation period of an enable signal CTRL_EN. The controller 130 may increase the level of the output voltage VOUT of the output terminal OND during a specific period when a load current ILOAD (to be described later) increases so that the undershoot phenomenon can be prevented in the output terminal OND.

Here, the controller 130 may include a voltage controller 131 and a switching circuit 138. The voltage controller 131 may output a control signal CTRL that is capable of controlling the voltage division value of the voltage divider 120 in response to the enable signal CTRL_EN, the program enable signal PGM_EN, and the charge-pump enable signal CPUMP_EN. Also, the switching circuit 138 may adjust the voltage division value of the voltage divider 120 in response to the control signal CTRL. For example, the switching circuit 138 may include an NMOS transistor N1. The NMOS transistor N1 may include a drain terminal connected to the node NODE1, a source terminal connected to the node NODE2, and a gate terminal through which the NMOS transistor N1 may receive the control signal CTRL.

In some implementations, the voltage regulator 100 may refer to a low dropout (LDO) regulator. As can be seen from FIG. 1, a capacitor C1 and a load (L) may be illustrated together with the voltage regulator 100 for convenience of description.

The capacitor C1 may be connected between the output terminal OND of the voltage regulator 100 and the ground voltage terminal. Here, the capacitor C1 may be a reservoir capacitor for reducing the noise of the output terminal OND and constantly supplying the output voltage VOUT to the load L. The output voltage VOUT of the voltage regulator 100 may be supplied to the load L after being charged by the capacitor C1. Also, the load L may be connected between the output terminal OND and the ground voltage terminal to receive the output voltage VOUT of the voltage regulator 100.

In some implementations, the voltage regulator 100 and the load L may be integrated or embedded in an integrated circuit, a system on chip (SoC), a processor, an application processor, a memory controller, or a display driver IC.

The load L may refer to a circuit (e.g., a digital logic circuit or an analog circuit) configured to use the output voltage VOUT of the voltage regulator 100, without being limited thereto.

The load current ILOAD output from the voltage regulator 100 may be supplied to the load L. For example, when the load current ILOAD that is used in the load L rapidly increases from a low level to a high level, the undershoot phenomenon may occur in which the output voltage VOUT temporarily decreases when the output voltage VOUT is supplied to the load L. Therefore, in some implementations, when the load current ILOAD increases due to the operation of the load L, the controller 130 may adjust the voltage division value of the voltage divider 120 to increase the level of the output voltage VOUT, thereby suppressing the undershoot phenomenon in the output terminal OND.

The operation of the voltage regulator 100 having such a configuration will be described in more detail below.

Figure 2:
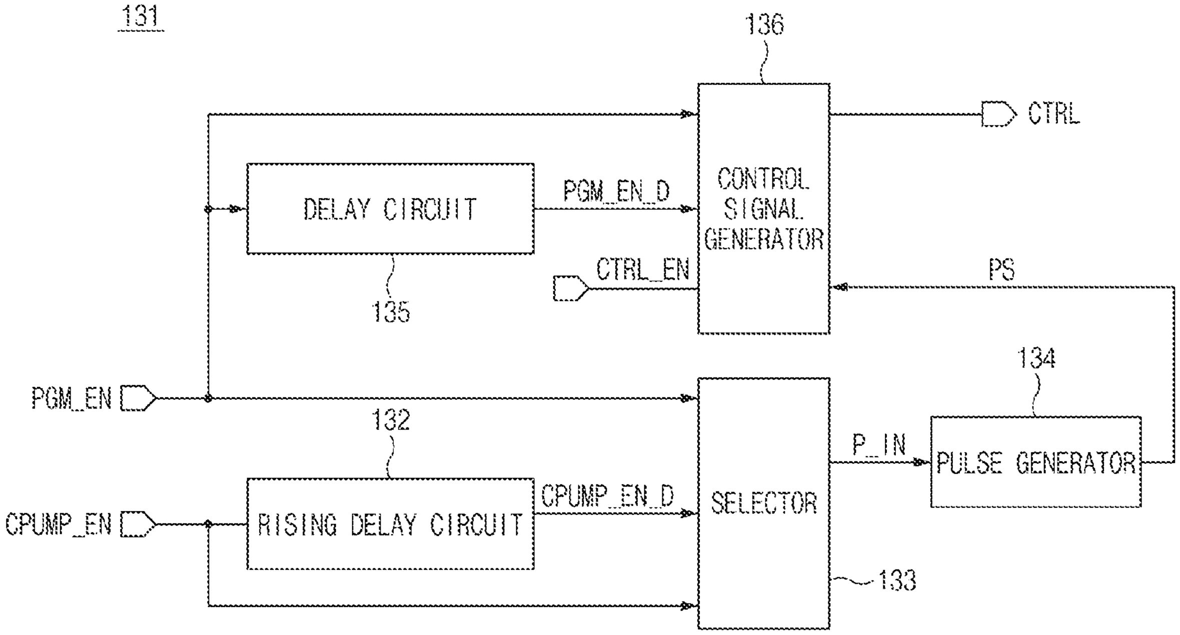
FIG. 2 is a detailed schematic diagram illustrating an example of a voltage controller shown in FIG. 1 based on some implementations of the disclosed technology.

FIG. 2 is a detailed schematic diagram illustrating an example of the voltage controller 131, shown in FIG. 1, based on some implementations of the disclosed technology.

Referring to FIG. 2, the voltage controller 131 may include a rising delay circuit 132, a selector 133, a pulse generator 134, a delay circuit 135, and a control signal generator 136.

Here, the rising delay circuit 132 may generate a rising delay signal CPUMP_EN_D by delaying a charge-pump enable signal CPUMP_EN. For example, the rising delay circuit 132 may generate the rising delay signal CPUMP_EN_D by delaying only the rising edge signal of the charge-pump enable signal CPUMP_EN for a predetermined time.

The selector 133 may select any one of the program enable signal PGM_EN and the rising delay signal CPUMP_EN_D in response to the charge-pump enable signal CPUMP_EN and may thus output the selected signal as a pulse input signal P_IN. The pulse generator 134 may generate a pulse signal PS in response to the pulse input signal P_IN.

The delay circuit 135 may generate a delay signal PGM_EN_D by delaying the program enable signal PGM_EN for a predetermined time. Also, the control signal generator 136 may generate a control signal CTRL in response to the enable signal CTRL_EN, the program enable signal PGM_EN, the delay signal PGM_EN_D, and the pulse signal PS.

Figure 3:
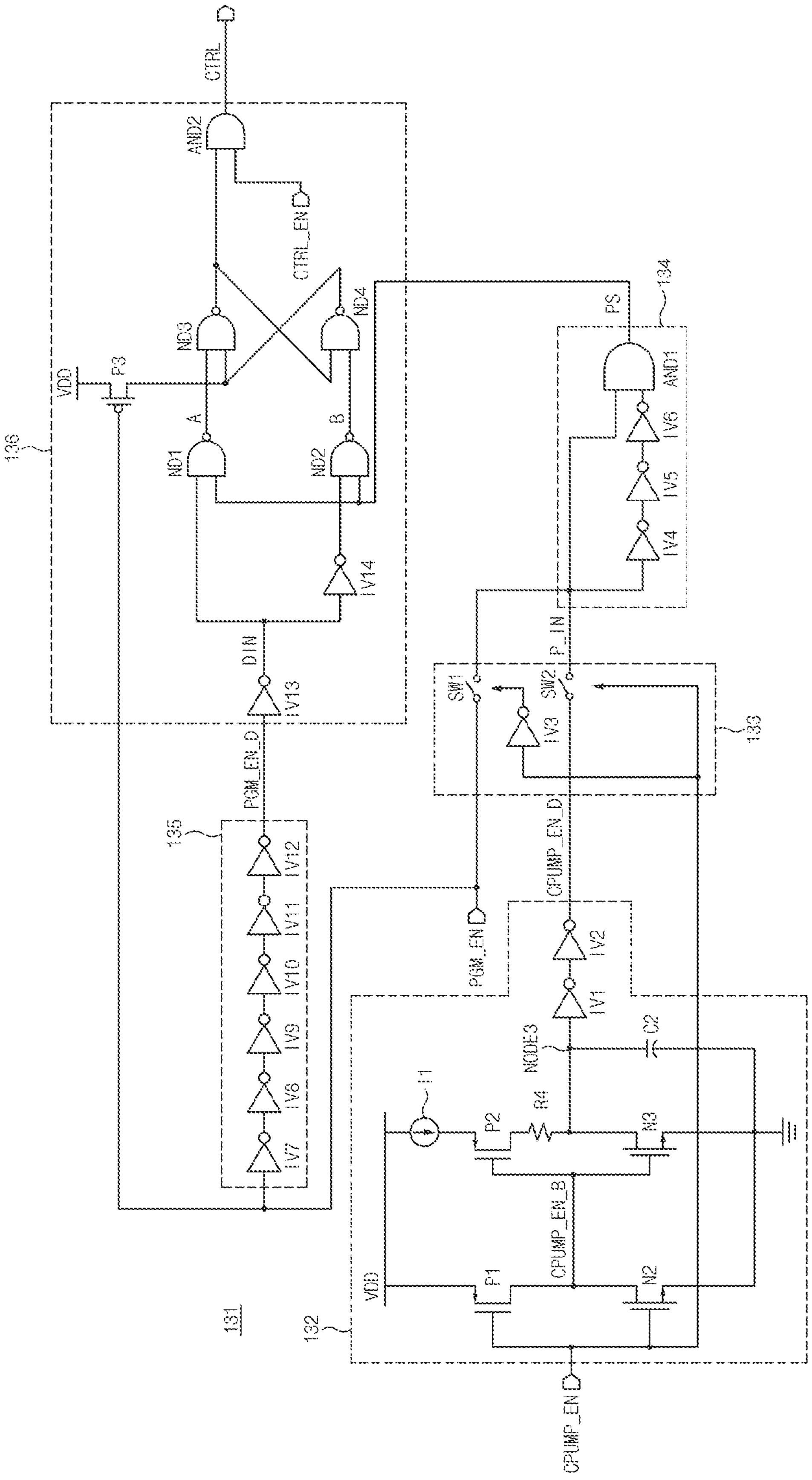
FIG. 3 is a detailed circuit diagram illustrating an example of the voltage controller shown in FIG. 2 based on some implementations of the disclosed technology.

FIG. 3 is a detailed circuit diagram illustrating an example of the voltage controller 131 shown in FIG. 2 based on some implementations of the disclosed technology.

Referring to FIG. 3, the rising delay circuit 132 may include a plurality of PMOS transistors P1 and P2, a plurality of NMOS transistors N2 and N3, a current source I1, a resistor R4, a capacitor C2, and a plurality of inverters IV1 and IV2.

Here, the PMOS transistor P1 and the NMOS transistor N2 may be connected in series between the power-supply voltage (VDD) input terminal and the ground voltage terminal. In addition, the PMOS transistor P1 and the NMOS transistor N2 may invert the charge-pump enable signal CPUMP_EN that is applied through a common gate terminal and may thus output an inverted charge-pump enable signal CPUMP_EN_B having an opposite phase compared to the charge-pump enable signal (CPUMP_EN)

The PMOS transistor P2 may be connected between the current source I1 and the resistor R4. The resistor R4 may be connected between the PMOS transistor P2 and the NMOS transistor N2. The NMOS transistor N2 may be connected between the resistor R4 and the ground voltage terminal. The inverted charge-pump enable signal CPUMP_EN_B may be applied to the PMOS transistor P2 and the NMOS transistor N3 through a common gate terminal. The current source I1 may be connected between the power-supply voltage (VDD) input terminal and the PMOS transistor P2. The current source I1 may supply a bias current to the PMOS transistor P2 in response to the power-supply voltage VDD. The capacitor C2 may be connected between the node NODE3 and the ground voltage terminal. A delay value of the rising delay circuit 132 may be set by an RC value of the resistor R4 and the capacitor C2. In addition, the inverters IV1 and IV2 may output the rising delay signal CPUMP_EN_D by delaying the output of the node NODE3 for a predetermined time.

In addition, the selector 133 may include an inverter IV3 and a plurality of switching elements SW1 and SW2. The switching element SW1 may output the program enable signal PGM_EN as the pulse input signal P_IN in response to the charge-pump enable signal CPUMP_EN that has been inverted by the inverter IV3. Also, the switching element SW2 may output the rising delay signal CPUMP_EN_D as the pulse input signal P_IN in response to the charge-pump enable signal CPUMP_EN.

For example, when the charge-pump enable signal CPUMP_EN is deactivated (e.g., when the charge-pump enable signal is at a low level), the switching element SW1 of the selector 133 may be turned on so that the program enable signal PGM_EN may be output as the pulse input signal P_IN. On the other hand, when the charge-pump enable signal CPUMP_EN is activated (e.g., when the charge-pump enable signal is at a high level), the switching element SW2 of the selector 133 may be turned on so that the rising delay signal CPUMP_EN_D may be output as the pulse input signal P_IN.

In addition, the pulse generator 134 may include a plurality of inverters (IV4, IV5, IV6) and an AND gate AND1. Here, the plurality of inverters IV4, IV5, and IV6 may delay the pulse input signal P_IN for a predetermined time. Also, the AND gate AND1 may generate the pulse signal PS by performing an AND operation between the pulse input signal P_IN and the output signal of the inverter IV6.

For example, the pulse generator 134 may generate the pulse signal PS in the form of a one-shot pulse signal having a constant pulse width. The one-shot pulse signal may be generated in the form of a positive (+) pulse or a negative (−) pulse. In some implementations, an example in which the one-shot pulse signal is generated in the form of a positive (+) pulse will hereinafter be described for convenience of description.

Also, the delay circuit 135 may include a plurality of inverters IV7 to IV12. The plurality of inverters IV7 to IV12 may generate a delay signal PGM_EN_D by delaying the program enable signal PGM_EN for a predetermined time. In some implementations, the delay circuit 135 may generate the delay signal PGM_EN_D by non-inverting the program enable signal PGM_EN.

In addition, the control signal generator 136 may include a plurality of inverters IV13 and IV14, a plurality of NAND gates ND1 to ND4, an AND gate AND2, and a PMOS transistor P3.

Here, the inverter IV13 may output an input signal DIN by inverting the delay signal PGM_EN_D. The NAND gate ND1 may perform a NAND operation between the input signal DIN and the pulse signal PS and may thus output a signal A. The NAND gate ND2 may perform a NAND operation between the input signal DIN that has been inverted by the inverter IV14 and the pulse signal PS and may thus output a signal B. The NAND gate ND3 may perform a NAND operation between the signal A and the output signal of the NAND gate ND4. The NAND gate ND4 may perform a NAND operation between the signal B and the output signal of the NAND gate ND3. The AND gate AND2 may generate the control signal CTRL by performing an AND operation between the output signal of the NAND gate ND3 and the enable signal CTRL_EN. The PMOS transistor P3 may be connected between the power-supply voltage (VDD) input terminal and the input terminal of the NAND gate ND3 and may thus receive the program enable signal PGM_EN through a gate terminal thereof.

The operation of the voltage controller 131 having such a configuration will be described in detail with reference to a timing diagram of FIG. 4 to be described later.

Figure 4:
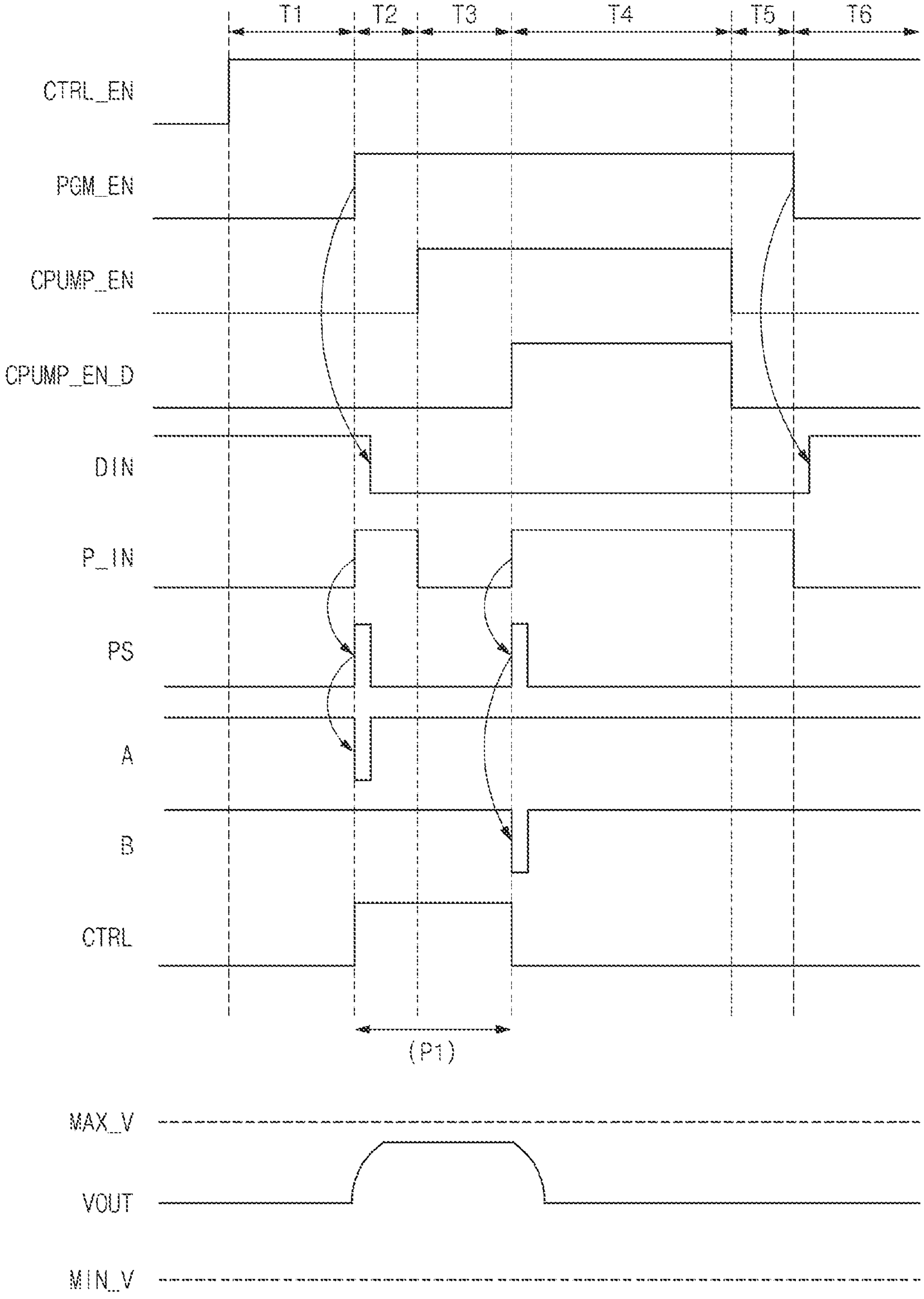
FIG. 4 is a timing diagram illustrating an example of operations of the voltage controller shown in FIG. 2 based on some implementations of the disclosed technology.

FIG. 4 is a timing diagram illustrating an example of operations of the voltage controller 131, shown in FIG. 2, based on some implementations of the disclosed technology.

Referring to FIG. 4, when the enable signal CTRL_EN transitions to a high level in period T1, the operation of the voltage controller 131 may be activated. A period in which the enable signal CTRL_EN becomes a high level and the controller 130 remains activated may follow periods T1 to T6.

Thereafter, since the switching element SW1 of the selector 133 is turned on in a state in which the charge-pump enable signal CPUMP_EN is at a low level in period T2, the program enable signal PGM_EN may be output as the pulse input signal P_IN. That is, when the program enable signal PGM_EN transitions to a high level, the pulse input signal P_IN may be output at a high level.

Then, the pulse generator 134 may generate a pulse signal PS in the form of a one-shot pulse signal in synchronization with a rising edge of the pulse input signal P_IN when the pulse input signal P_IN transitions to a high level. Here, the pulse signal PS may be generated in the form of a positive (+) pulse having a predetermined pulse width.

When the program enable signal PGM_EN transitions to a high level in period T2, the input signal DIN may transition to a low level after the delay time of the delay circuit 135. At this time, when the program enable signal PGM_EN is at a high level, the PMOS transistor P3 of the control signal generator 136 may remain turned off.

The NAND gate ND1 of the control signal generator 136 may perform a NAND operation between the high-level input signal DIN and the high-level pulse signal PS to output the signal A at a low level. Also, the NAND gate ND2 of the control signal generator 136 may perform a NAND operation between the low-level input signal DIN that has been inverted by the inverter IV13 and the high-level pulse signal PS and may enable the signal B to remain at a high level.

Then, the NAND gates ND3 and ND4 may perform a NAND operation between the low-level signal A and the high-level signal B so that the output signal of the NAND gate ND3 becomes a high level. Accordingly, the AND gate AND2 may perform an AND operation between the high-level enable signal CTRL_EN and the high-level output signal of the NAND gate ND3 so that the control signal CTRL may transition to a high level.

Subsequently, in period T3, the charge-pump enable signal CPUMP_EN may transition to a high level. When the charge-pump enable signal CPUMP_EN is activated, the switching element SW1 of the selector 133 may be turned off and the switching element SW2 may be turned on so that the rising delay signal CPUMP_EN_D of the rising delay circuit 132 may be output as an input signal P_IN. That is, since the rising delay signal CPUMP_EN_D is at a low level, the pulse input signal P_IN may transition to a low level.

Since the pulse generator 134 generates a one-shot pulse signal in synchronization with the rising edge of the pulse input signal P_IN, the pulse signal PS may maintain a low level in period T3 at which the pulse input signal P_IN is at a low level.

When the pulse signal PS and the input signal DIN are at a low level, both the signal A and the signal B may maintain a high level. Then, the control signal generator 136 may logically combine the high-level enable signal CTRL_EN and the signals A and B and may thus output the control signal CTRL at a high level during period T3.

When the charge-pump enable signal CPUMP_EN transitions to a high level in the T3 period, the rising delay circuit 132 may delay the rising edge of the charge-pump enable signal CPUMP_EN for a predetermined time, and the rising delay signal CPUMP_EN_D may then transition to a high level.

In period T4, the rising delay signal CPUMP_EN_D may transition to a high level. Then, in a state in which the switching element SW2 of the selector 133 is turned on, the rising delay signal CPUMP_EN_D may be output as the pulse input signal P_IN. The pulse generator 134 may generate the pulse signal PS in the form of a one-shot pulse signal in synchronization with the rising edge of the pulse input signal P_IN when the pulse input signal P_IN transitions to a high level. Here, the pulse signal PS may be generated in the form of a positive (+) pulse signal having a predetermined pulse width.

The NAND gate ND1 of the control signal generator 136 may perform a NAND operation between the low-level input signal DIN and the high-level pulse signal PS and may thus output the signal A at a high level. Also, the NAND gate ND2 of the control signal generator 136 may perform a NAND operation between the high-level input signal DIN that has been inverted by the inverter IV13 and the high-level pulse signal PS so that the signal B may transition to a low level.

Then, the NAND gates ND3 and ND4 may perform a NAND operation between the high-level signal A and the low-level signal B so that the output signal of the NAND gate ND3 becomes a low level. Accordingly, the AND gate AND2 may perform an AND operation between the high-level enable signal CTRL_EN and the low-level output signal of the NAND gate ND3 so that the control signal CTRL may transition to a low level. That is, the control signal CTRL may be activated in synchronization with a first activation time point (i.e., T2 period) of the pulse signal PS and may be deactivated in synchronization with a second activation time point of the pulse signal PS.

Subsequently, when the charge-pump enable signal CPUMP_EN transitions to a low level in period T5, the rising delay signal CPUMP_EN_D may also transition to a low level. Also, when the charge-pump enable signal CPUMP_EN transitions to a low level, the switching element SW1 of the selector 133 may be turned on again so that the program enable signal PGM_EN may be output as the pulse input signal P_IN. At this time, since the pulse input signal P_IN maintains a high level, the pulse signal PS generated by the pulse generator 134 may also maintain a low level.

Therefore, the control signal generator 136 may logically combine the low-level input signal DIN, the low-level pulse signal PS, and the high-level signals A and B so that the control signal CTRL may be maintained at a low level.

Subsequently, the program enable signal PGM_EN may transition to a low level in period T6. Then, after the delay time of the delay circuit 135, the input signal DIN may transition to a high level. When the program enable signal PGM_EN transitions to a low level, the pulse input signal P_IN may transition to a low level. As a result, the input signal of the AND gate AND1 of the pulse generator 134 may transition to a low level so that the pulse signal PS may be maintained at a low level.

Then, when the program enable signal PGM_EN transitions to a low level in period T6, the PMOS transistor P3 of the control signal generator 136 may be turned on so that the input signal of the NAND gate ND3 may be driven with the power-supply voltage (VDD) level. Accordingly, the input signal of the AND gate AND2 of the control signal generator 136 may transition to a low level so that the control signal CTRL may be maintained at a low level.

In other words, the control signal CTRL may be activated for a certain period T2 from a time point at which the program enable signal PGM_EN is activated, and the activation state of the control signal CTRL may be continuously maintained during the T3 period ranging from a time point at which the rising delay signal CPUMP_EN_D is activated to the other time point at which the charge-pump enable signal CPUMP_EN is activated so that the output voltage VOUT may increase.

As described above, according to the embodiment of the disclosed technology, when the undershoot phenomenon occurs at the output terminal OND of the voltage regulator 100, the voltage division value of the voltage divider 120 may be adjusted in response to activating the control signal CTRL during the P1 period (i.e., T2 and T3 periods) so that the voltage level of the output voltage VOUT may increase up to a predetermined level.

Here, the increase value of the output voltage VOUT does not exceed a maximum voltage MAX_V that can be supplied from the voltage regulator 100 to the load L and may be set in the range from the maximum voltage MAX_V to the minimum voltage MIN_V.

Meanwhile, the operation of the voltage regulator 100 based on some implementations of the disclosed technology will hereinafter be described in more detail.

In some implementations, the load L may refer to a memory (e.g., a programmable non-volatile memory or a one-time programmable (OTP) memory). The voltage regulator 100 may refer to a power-supply device that supplies power to be used in a core region of a memory.

The voltage regulator 100 may supply power having a specific voltage level to the memory during a program or read operation of the memory. The operation mode of the memory may be broadly classified into a program operation mode in which data is programmed into the memory and a read operation mode in which data programmed in the memory is read.

First, when the memory is in a read mode, the enable signal CTRL_EN may be deactivated, and the program enable signal PGM_EN and the charge-pump enable signal CPUMP_EN may remain deactivated (i.e., a low level). Then, the control signal CTRL, which is an output of the voltage controller 131, may be deactivated. For example, when the control signal CTRL is at a low level, the NMOS transistor N1 may be turned off. When the NMOS transistor N1 is turned off, a value of the output voltage VOUT1 may be determined by a voltage division value of the resistors R1, R2, and R3. The output voltage VOUT1 may be calculated as represented by the following equation 1.

$$VOUT=\{1+R1/(R2+R3)\}\times VREF \quad \text{[Equation 1]}$$

On the other hand, during the program mode of the memory, the enable signal CTRL_EN may be activated. Also, during the program mode of the memory, the program enable signal PGM_EN may be activated (e.g., transition from a low level to a high level) to operate a high-voltage circuit located inside the memory. Also, during the program mode, the charge-pump enable signal CPUMP_EN may be activated (e.g., transition from a low level to a high level) to operate the charge-pump circuit located inside the memory.

As a result, the control signal CTRL, which is an output signal of the voltage controller 131, may be activated. For example, when the control signal CTRL is at a high level, the NMOS transistor N1 may be turned on. When the NMOS transistor N1 is turned on, the value of the output voltage VOUT2 may be determined by the voltage division value of the resistors R1 and R3, except for the resistor R2 connected between the node NODE1 and the node NODE2. The output voltage VOUT2 may be calculated as represented by the following equation 2.

$$VOUT2=\{1+R1/R3\}\times VREF \quad \text{[Equation 2]}$$

That is, the output voltage according to Equation 1 may be defined as 'VOUT1', and the output voltage according to Equation 2 may be defined as 'VOUT2'. Then, in Equation 1, the output voltage VOUT1 may be determined by a value of the denominator denoted by (R2+R3). In Equation 2, the output voltage VOUT2 may be determined by a value of the denominator denoted by R3. Since the denominator value shown in Equation 2 becomes smaller, the output voltage VOUT2 may have a higher gain value for the voltage division value than the output voltage VOUT1 so that the output voltage VOUT2 may be higher than the output voltage VOUT1.

In this case, during the program mode of the memory, the output voltage VOUT of the output terminal OND of the voltage regulator 100 may increase to a certain level so that an overshoot phenomenon may be suppressed.

Figure 5:
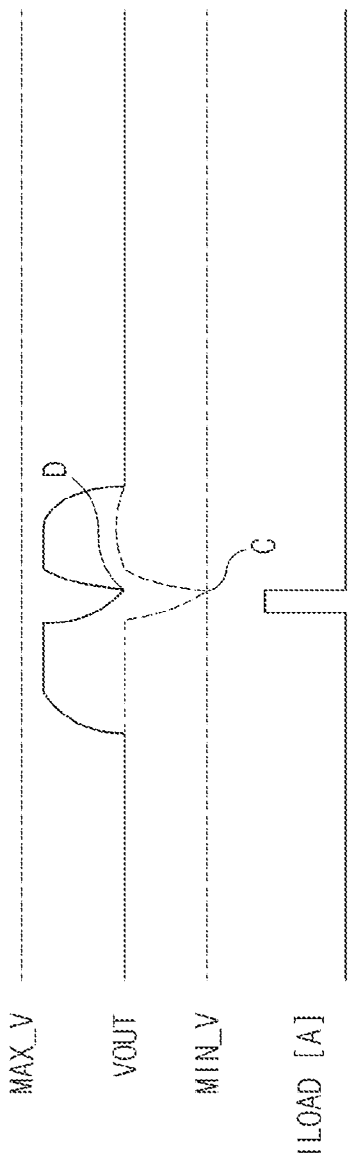
FIG. 5 is a timing diagram illustrating the effect of suppressing an undershoot phenomenon in a voltage regulator based on some implementations of the disclosed technology.

FIG. 5 is a timing diagram illustrating the effect of suppressing the undershoot phenomenon in the voltage regulator 100 based on some implementations of the disclosed technology.

When a predetermined time elapses after the program enable signal PGM_EN and the charge-pump enable signal CPUMP_EN are activated, the voltage regulator 100 must instantaneously supply a high load current ILOAD to the memory for a stable programming operation of the memory.

That is, the load current ILOAD may instantaneously and rapidly change from a target level to a peak level. As a result, as shown in (C) of FIG. 5, the undershoot phenomenon may occur in which the output voltage (VOUT) level of the voltage regulator 100 falls below the minimum voltage MIN_V (i.e., target voltage), resulting in occurrence of malfunction of the memory.

In order to prevent the undershoot phenomenon, the voltage gain of the output terminal OND of the voltage regulator 100 should be increased. However, when the capacitance of the capacitor C1 connected to the output terminal OND is increased in order to increase the voltage gain of the output terminal OND, current consumption may increase and the chip size may also increase.

As described above, when the memory enters the program mode, the program enable signal PGM_EN and the charge-pump enable signal CPUMP_EN may be activated and the load current ILOAD may increase after a predetermined time elapses. Accordingly, the voltage regulator 100, based on some implementations of the disclosed technology, may receive the program enable signal PGM_EN and the charge-pump enable signal CPUMP_EN through the controller 130 and may thus change the output voltage VOUT by adjusting the voltage division value of the voltage divider 120.

That is, according to the embodiment of the disclosed technology, since the output voltage VOUT increases to a predetermined level or higher, even when the load current ILOAD greatly increases, the output voltage (VOUT) level may be maintained at a target voltage level without decreasing to the minimum voltage MIN_V or less, as shown in (D)

of FIG. 5. Therefore, the output voltage VOUT may increase to a predetermined level or higher during the program mode of the memory such that the possibility of the undershoot phenomenon leading to the memory malfunctioning may be reduced.

Figure 6:
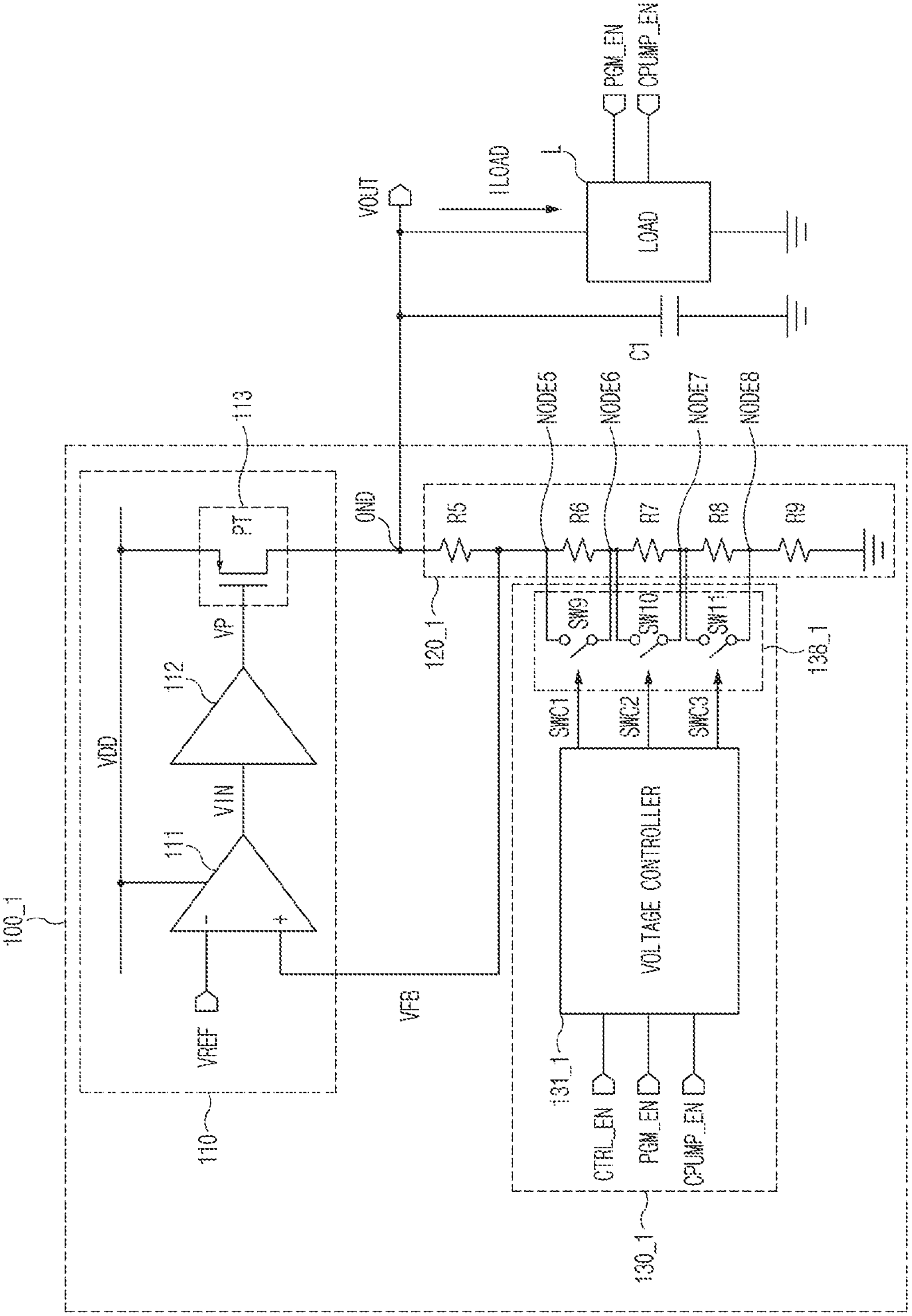
FIG. 6 is a circuit diagram showing an example of a voltage regulator based on some other implementations of the disclosed technology.

FIG. 6 is a circuit diagram showing an example of the voltage regulator 100_1 based on some other implementations of the disclosed technology. In the embodiment of FIG. 6, the same reference numerals will be used for the same components as those of FIG. 1, and as such, redundant descriptions will herein be omitted for brevity.

Referring to FIG. 6, the voltage regulator 100_1 may include a voltage generator 110, a voltage divider 120_1, and a controller 130_1.

The voltage generator 110 may receive the reference voltage VREF and the feedback voltage VFB to generate the output voltage VOUT. Here, the voltage generator 110 may include an amplifier 111, a buffer 112, and a driver 113.

The voltage divider 120_1, according to the embodiment of FIG. 6, may include a plurality of resistors R5 to R9 connected in series between an output terminal OND and a ground voltage terminal. The resistor R5 may be connected between the output terminal OND and the node NODE5. The resistor R6 may be connected between the node NODE5 and the node NODE6. The resistor R7 may be connected between the node NODE6 and the node NODE7. The resistor R8 may be connected between the node NODE7 and the node NODE8. The resistor R9 may be connected between the node NODE8 and the ground voltage terminal. The voltage divider 120_1 may generate a feedback voltage VFB by dividing the output voltage VOUT through the plurality of resistors R5 to R9.

Although there are five resistors (R5 to R9) in the embodiment of FIG. 6, other implementations are also possible, and it should be noted that the number of resistors may also be sufficiently changed as needed.

The controller 130_1 may include a voltage controller 131_1 and a switching circuit 138_1. The voltage controller 131_1 may output a plurality of control signals SWC1 to SWC3 for controlling a voltage division value of the voltage divider 120_1 in response to the enable signal CTRL_EN, the program enable signal PGM_EN, and the charge-pump enable signal CPUMP_EN. The switching circuit 138_1 may adjust the voltage division value of the voltage divider 120_1 in response to the plurality of control signals SWC1 to SWC3.

For example, the switching circuit 138_1 may include a plurality of switching elements SW9 to SW11 connected in parallel to the plurality of resistors R6 to R8. The switching element SW9 may be connected between the node NODE5 and the node NODE6 so that the switching operation may be controlled by the control signal SWC1. The switching element SW10 may be connected between the node NODE6 and the node NODE7 so that the switching operation may be controlled by a control signal SWC2. The switching element SW11 may be connected between the node NODE7 and the node NODE8 so that the switching operation may be controlled by a control signal SWC3.

In some implementations, when the load current ILOAD increases due to the operation of the load L, the controller 130_1 may adjust the voltage division value of the voltage divider 120_1 such that the level of the output voltage VOUT may be increased. In addition, in some implementations of the disclosed technology, in order to prevent the undershoot phenomenon from occurring instantaneously when the increased output voltage VOUT returns to the original target level, the increased output voltage VOUT may sequentially decrease.

Figure 7:
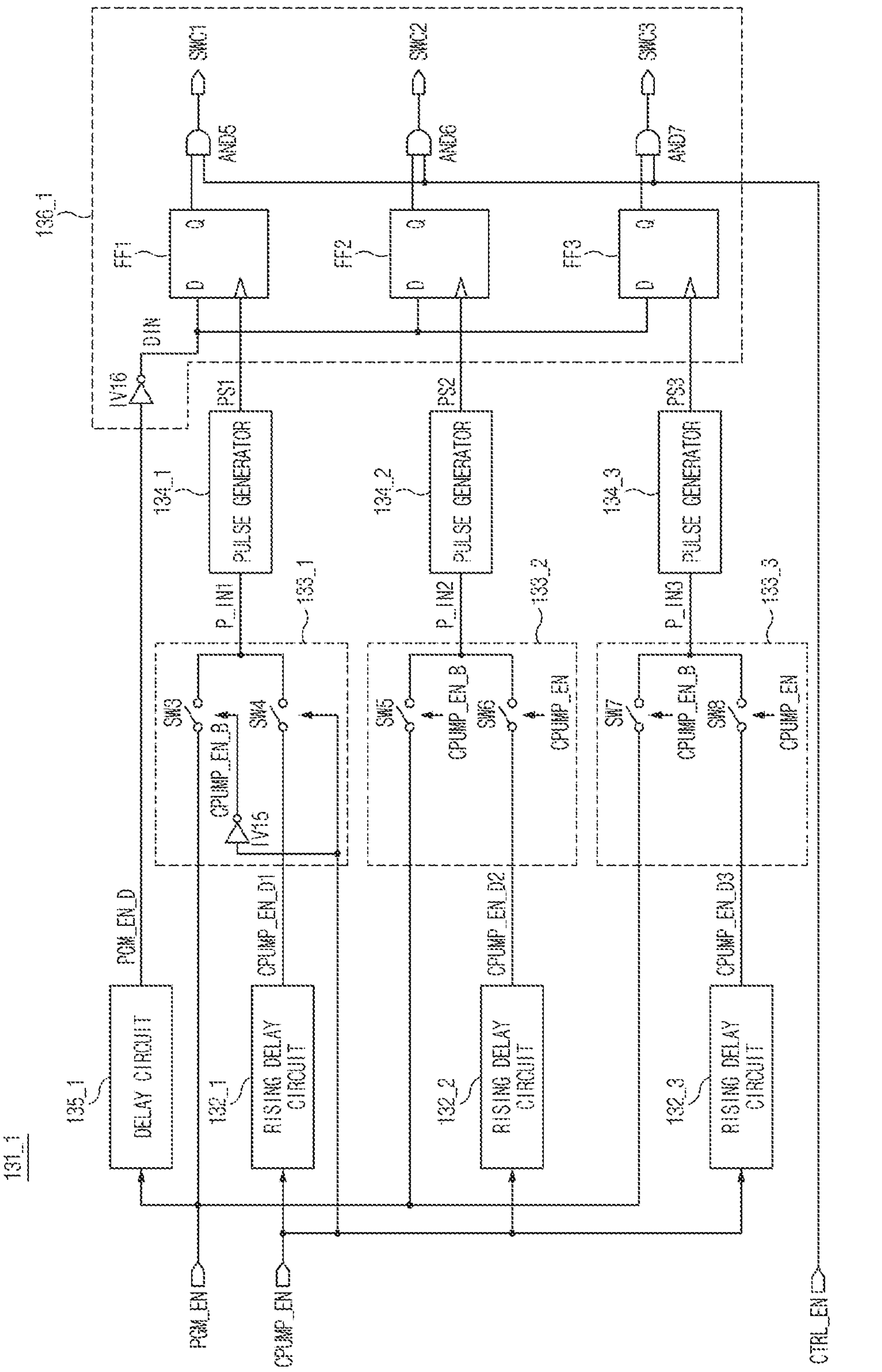
FIG. 7 is a detailed schematic diagram illustrating an example of the voltage controller shown in FIG. 6 based on some implementations of the disclosed technology.

FIG. 7 is a detailed schematic diagram illustrating an example of the voltage controller 131_1, shown in FIG. 6, based on some implementations of the disclosed technology.

Referring to FIG. 7, the voltage controller 131_1 may include a plurality of rising delay circuits 132_1 to 132_3, a plurality of selectors 133_1 to 133_3, a plurality of pulse generators 134_1 to 134_3, a delay circuit 135_1, and a control signal generator 136_1.

Here, the plurality of rising delay circuits 132_1 to 132_3 may respectively generate a plurality of rising delay signals CPUMP_EN_D1 to CPUMP_EN_D3 by delaying the charge-pump enable signal CPUMP_EN. For example, the plurality of rising delay circuits 132_1 to 132_3 may respectively generate the plurality of rising delay signals CPUMP_EN_D1 to CPUMP_EN_D3 by delaying only the rising edge signal of the charge-pump enable signal CPUMP_EN for a predetermined time.

In some implementations, after the charge-pump enable signal CPUMP_EN is activated to a high level, the plurality of rising delay circuits 132_1 to 132_3 may delay the rising edge signal at a high level with different delay times (i.e., delay times D1, D2, and D3 to be described later) such that the plurality of rising delay signals CPUMP_EN_D1 to CPUMP_EN_D3 may be controlled to be deactivated at different time points.

Upon receiving the charge-pump enable signal CPUMP_EN and the charge-pump enable signal CPUMP_EN_B that have been inverted by the inverter IV15, the plurality of selectors 133_1 to 133_3 may select the output of the program enable signal PGM_EN or any one of the plurality of rising delay signals CPUMP_EN_D1 to CPUMP_EN_D3 and may output the plurality of pulse input signals P_IN1 to P_IN3, respectively. In more detail, in response to the charge-pump enable signal CPUMP_EN_B that has been inverted by the inverter IV15 and the charge-pump enable signal CPUMP_EN, the selector 133_1 may select any one of the output of the program enable signal PGM_EN or the rising delay signal CPUMP_EN_D1 and thus outputting the pulse input signal P_IN1, the selector 133_2 may select any one of the output of the program enable signal PGM_EN or the rising delay signal CPUMP_EN_D2 and thus outputting the pulse input signal P_IN2, and the selector 133_3 may select any one of the output of the program enable signal PGM_EN or the rising delay signal CPUMP_EN_D3 and thus outputting the pulse input signal P_IN3.

Here, the selector 133_1 may include a plurality of switching elements SW3 and SW4. The switching element SW3 may output the program enable signal PGM_EN as the pulse input signal P_IN1 in response to the charge-pump enable signal CPUMP_EN_B that has been inverted by the inverter IV15. Also, the switching element SW4 may output the rising delay signal CPUMP_EN_D1 as the pulse input signal P_IN1 in response to the charge-pump enable signal CPUMP_EN.

The selector 133_2 may include a plurality of switching elements SW5 and SW6. The switching element SW5 may output the program enable signal PGM_EN as the pulse input signal P_IN2 in response to the inverted charge-pump enable signal CPUMP_EN_B. Also, the switching element SW6 may output the rising delay signal CPUMP_EN_D2 as the pulse input signal P_IN2 in response to the charge-pump enable signal CPUMP_EN.

The selector 133_3 may include a plurality of switching elements SW7 and SW8. The switching element SW7 may output the program enable signal PGM_EN as the pulse input signal P_IN3 in response to the inverted charge-pump enable signal CPUMP_EN_B. Also, the switching element SW8 may output the rising delay signal CPUMP_EN_D3 as the pulse input signal P_IN3 in response to the charge-pump enable signal CPUMP_EN.

For example, when the charge-pump enable signal CPUMP_EN is deactivated (e.g., when the charge-pump enable signal CPUMP_EN is at a low level) in the plurality of selectors 133_1 to 133_3, the switching elements SW3, SW5, and SW7 may be turned on so that the selector 133_1 may output the program enable signal PGM_EN as the pulse input signal P_IN1, the selector 133_2 may output the program enable signal PGM_EN as the pulse input signal P_IN2, and the selector 133_3 may output the program enable signal PGM_EN as the pulse input signal P_IN3. On the other hand, when the charge-pump enable signal CPUMP_EN is activated (e.g., when the charge-pump enable signal CPUMP_EN is at a high level) in the plurality of selectors 133_1 to 133_3, the switching elements SW4, SW6, and SW8 may be turned on so that the selector 133_1 may output the rising delay signal CPUMP_EN_D1 as the pulse input signal P_IN1, the selector 133_2 may output the rising delay signal CPUMP_EN_D2 as the pulse input signal P_IN2, and the selector 133_3 may output the rising delay signal CPUMP_EN_D3 as the pulse input signal P_IN3.

The plurality of pulse generators 134_1 to 134_3 may generate a plurality of pulse signals PS1 to PS3 in response to the plurality of pulse input signals P_IN1 to P_IN3. The delay circuit 135_1 may generate a delay signal PGM_EN_D by delaying the program enable signal PGM_EN for a predetermined time.

The control signal generator 136_1 may generate a plurality of control signals SWC1 to SWC3 in response to the enable signal CTRL_EN, the delay signal PGM_EN_D, and the plurality of pulse signals PS1 to PS3. Here, the control signal generator 136_1 may include an inverter IV16, a plurality of flip-flops FF1 to FF3, and a plurality of AND gates AND5 to AND7.

The inverter IV16 may invert the delay signal PGM_EN_D to output the input signal DIN. The flip-flop FF1 may flip-flop the input signal DIN in response to the pulse signal PS1. The flip-flop FF2 may flip-flop the input signal DIN in response to the pulse signal PS2. Also, the flip-flop FF3 may flip-flop the input signal DIN in response to the pulse signal PS3.

The AND gate AND5 may perform an AND operation between the enable signal CTRL_EN and the output signal of the flip-flop FF1 to output the control signal SWC1. The AND gate AND6 may perform an AND operation between the enable signal CTRL_EN and the output signal of the flip-flop FF2 to output the control signal SWC2. The AND gate AND7 may perform an AND operation between the enable signal CTRL_EN and the output signal of the flip-flop FF3 to output the control signal SWC3.

In some implementations, although the detailed circuit diagrams of the plurality of rising delay circuits 132_1 to 132_3 and the plurality of pulse generators 134_1 to 134_3 are not separately shown in FIG. 7 for convenience of description, the rising delay circuits 132_1 to 132_3 and the pulse generators 134_1 to 134_3, shown in FIG. 7, may be implemented identically or similarly to the rising delay circuit 132 and the pulse generator 134 shown in FIG. 3.

Figure 8:
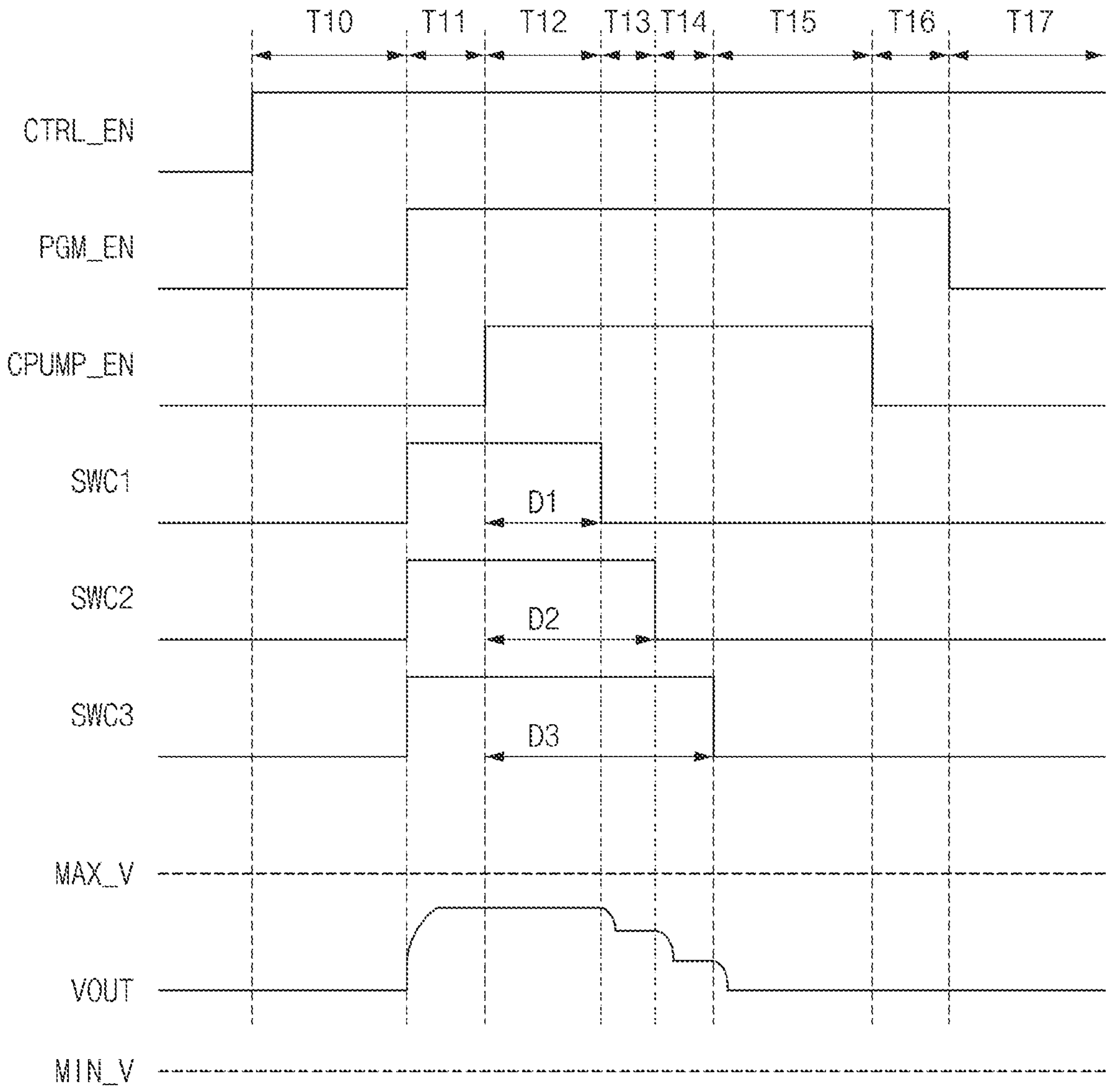
FIG. 8 is a timing diagram illustrating an example of operations of the voltage controller shown in FIG. 7 based on some implementations of the disclosed technology.

The operation of the voltage regulator 100_1 having the above-described constituent elements will hereinafter be described in detail with reference to the operation timing diagram of FIG. 8.

First, prior to reaching period T10, when the memory is in the read mode, the enable signal CTRL_EN may be deactivated, and the program enable signal PGM_EN and the charge-pump enable signal CPUMP_EN may remain deactivated (i.e., a low level).

Then, all of the plurality of control signals SWC1 to SWC3, which are the output signals of the voltage controller 131_1, may be deactivated. For example, when the plurality of control signals SWC1 to SWC3 is at a low level, all of the plurality of switching elements SW9 to SW11 may be turned off. When the plurality of switching elements SW9 to SW11 is turned off, the value of the output voltage VOUT3 may be determined by the voltage division value of the resistors R5 to R9. The output voltage VOUT3 may be calculated as represented by the following equation 3.

$$VOUT3=\{1+R5/(R6+R7+R8+R9)\}\times VREF \quad \text{[Equation 3]}$$

Thereafter, the enable signal CTRL_EN may be activated in period T10. Subsequently, when the program is in the program mode during period T11, the program enable signal PGM_EN may be activated.

When the program enable signal PGM_EN is activated in period T11, all of the plurality of control signals SWC1 to SWC3 corresponding to the output signals of the voltage controller 131_1 may be activated.

For example, when all of the control signals SWC1 to SWC3 are at a high level, all of the switching elements SW9 to SW11 may be turned on. When all of the switching elements SW9 to SW11 are turned on, the output voltage VOUT4 may be determined by the voltage division value of the resistors R5 and R9 except for the resistors R6, R7, and R8 (the resistor R6 being connected between the node NODE5 and the node NODE6, the resistor R7 being connected between the node NODE6 and the node NODE7, and the resistor R8 being connected between the node NODE7 and the node NODE8), the output voltage VOUT4 may be calculated as represented by the following equation 4.

$$VOUT4=\{1+R5/R9\}\times VREF \quad \text{[Equation 4]}$$

That is, the output voltage according to Equation 3 may be defined as 'VOUT3', and the output voltage according to Equation 4 may be defined as 'VOUT4'. Then, in Equation 3, the output voltage VOUT3 may be determined by a value of the denominator denoted by (R6+R7+R8+R9). In Equation 4, the output voltage VOUT4 may be determined by a value of the denominator denoted by R9. Since the denominator value shown in Equation 4 becomes smaller, the output voltage VOUT4 may have a higher gain value for the voltage division value than the output voltage VOUT3 so that the output voltage VOUT4 may be higher than the output voltage VOUT3.

In this case, during the program mode of the memory, the output voltage VOUT of the output terminal OND of the voltage regulator 100 may increase to a certain level so that the overshoot phenomenon may be suppressed.

In addition, in some implementations, when the output voltage VOUT increases to a predetermined level and returns to an original target level, the voltage controller 131_1 may sequentially deactivate the plurality of control signals SWC1 to SWC3 such that the switching elements SW9 to SW11 may be controlled to be sequentially turned off.

In period T12, the charge-pump enable signal CPUMP_EN may be activated. After the control signals SWC1 to SWC3 are delayed by the delay times of the rising delay circuits 132_1 to 132_3 from the activation time of the charge-pump enable signal CPUMP_EN, the control signals SWC1 to SWC3 may be sequentially deactivated to a low level.

For example, in period T12, the control signal SWC1 may be deactivated after being delayed by the delay time D1 of the rising delay circuit 132_1. In each of periods T12 and T13, the control signal SWC2 may be deactivated after being delayed by the delay time D2 of the rising delay circuit 132_2. In each of the periods T12, T13, and T14, the control signal SWC3 may be deactivated after being delayed by the delay time D3 of the rising delay circuit 132_3.

When the control signal SWC1 from among the plurality of control signals SWC1 to SWC3 is first deactivated to a low level, the switching element SW9 may be turned off. When the switching element SW9 is turned off, the value of the output voltage VOUT5 may be reduced by the voltage division value of the resistor R6 and the resistors R5 and R9. The output voltage VOUT5 may be calculated as represented by the following equation 5.

$$VOUT5=\{1+R5/(R6+R9)\}\times VREF \quad \text{[Equation 5]}$$

Thereafter, when the control signal SWC2 is deactivated to a low level, the switching element SW10 may be turned off. When the switching element SW10 is turned off, the value of the output voltage VOUT6 may be reduced by the voltage division value of the resistors R6 and R7 and the resistors R5 and R9. The output voltage VOUT6 may be calculated as represented by the following equation 6.

$$VOUT6=\{1+R5/(R6+R7+R9)\}\times VREF \quad \text{[Equation 6]}$$

Then, when the control signal SWC3 is deactivated to a low level, the switching element SW11 may be turned off. When the switching element SW11 is turned off, the value of the output voltage VOUT7 may be reduced by the voltage division value of the resistors R6, R7, and R8 and the resistors R5 and R9. The output voltage VOUT7 may be calculated as represented by the following equation 7.

$$VOUT7=\{1+R5/(R6+R7+R8+R9)\}\times VREF \quad \text{[Equation 7]}$$

Accordingly, in period T15, after the output voltage VOUT sequentially decreases, the original target level may be maintained. In period T16, the charge-pump enable signal CPUMP_EN may be deactivated to a low level. In period T17, the program enable signal PGM_EN may be deactivated to a low level.

As described above, according to the embodiment of the disclosed technology, when the output voltage VOUT increased to a predetermined level returns to the original target level in order to prevent the undershoot phenomenon during the program operation, the increased output voltage VOUT may be sequentially decreased such that another undershoot phenomenon that may occur during such return to the original target level may be prevented from occurring.

As is apparent from the above description, the embodiments of the disclosed technology may prevent the undershoot phenomenon from occurring in an output stage of the voltage regulator, thereby preventing malfunction of the load circuit located at a rear stage of the voltage regulator.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

SYMBOL OF EACH OF THE ELEMENTS IN THE FIGURES

110: a voltage generator
120: a voltage divider
130: a controller

What is claimed is:

1. A voltage regulator comprising:

a voltage generator configured to receive a reference voltage and a feedback voltage and configured to generate an output voltage corresponding to the feedback voltage;

a voltage divider configured to divide the output voltage to generate the feedback voltage; and a controller configured to control a voltage division value of the voltage divider in response to a program enable signal and a charge-pump enable signal during an activation period of an enable signal wherein:

during a predetermined period after activating the program enable signal, a resistance value of the voltage divider is adjusted in response to an output of the controller, and the feedback voltage is changed in response to the adjusted resistance value so that the output voltage increases to a predetermined target level or higher.

2. The voltage regulator according to claim 1, wherein the voltage generator includes:

an amplifier configured to compare the reference voltage with the feedback voltage, amplify a voltage based on a difference between the reference voltage and the feedback voltage, and output the amplified voltage;

a buffer configured to supply a driving voltage in response to the amplified voltage; and a driver configured to adjust a level of the output voltage in response to the driving voltage.

3. The voltage regulator according to claim 1, wherein the voltage divider includes:

a plurality of resistors connected in series between an output terminal of the output voltage and a ground voltage terminal.

4. The voltage regulator according to claim 1, wherein the controller is configured to:

generate a control signal to be activated for a predetermined period in response to the program enable signal and the charge-pump enable signal, and change a resistance value of the voltage divider in response to the control signal.

5. The voltage regulator according to claim 1, wherein the controller includes:

a voltage controller configured to generate a control signal for controlling the voltage division value of the voltage divider in response to the program enable signal and the charge-pump enable signal during the activation period of the enable signal; and a switching circuit configured to adjust a resistance value of the voltage divider in response to the control signal.

6. The voltage regulator according to claim 5, wherein the voltage controller includes:

a rising delay circuit configured to generate a rising delay signal by delaying a rising edge signal of the charge-pump enable signal;

a selector configured to select any one of the program enable signal and the rising delay signal in response to the charge-pump enable signal and configured to output the selected signal as a pulse input signal;

a pulse generator configured to generate a pulse signal in response to the pulse input signal;

a delay circuit configured to generate a delay signal by delaying the program enable signal for a predetermined time; and a control signal generator configured to generate the control signal in response to the enable signal, the program enable signal, the delay signal, and the pulse signal.

7. The voltage regulator according to claim 6, wherein the selector is configured to:

output the program enable signal as the pulse input signal when the charge-pump enable signal is deactivated; and output the rising delay signal as the pulse input signal when the charge-pump enable signal is activated.

8. The voltage regulator according to claim 6, wherein:

the pulse generator is configured to generate the pulse signal in the form of a one-shot pulse signal having a constant pulse width in synchronization with a rising edge of the pulse input signal.

9. The voltage regulator according to claim 6, wherein the control signal generator is configured to:

activate the control signal in synchronization with a first activation time point of the pulse signal; and deactivate the control signal in synchronization with a second activation time point of the pulse signal.

10. The voltage regulator according to claim 6, wherein:

the control signal is activated for a predetermined period from a time point at which the program enable signal is activated and remains activated until the rising delay signal is activated from a time point at which the charge-pump enable signal is activated.

11. The voltage regulator according to claim 5, wherein the voltage divider includes:

a first resistor connected between an output terminal of the output voltage and a first node; and a second resistor connected between the first node and a second node, and wherein the switching circuit includes:

a transistor configured to include a first terminal connected to the first node and a second terminal connected to the second node so that a switching operation is controlled by the control signal.

12. The voltage regulator according to claim 11, wherein the voltage divider is configured to:

determine the voltage division value in response to the first resistor and the second resistor when the transistor is turned off by deactivating the control signal; and determine the voltage division value in response to the first resistor when the transistor is turned on by activating the control signal.

13. The voltage regulator according to claim 1, wherein:

the program enable signal and the charge-pump enable signal are activated in a program mode of a load to which the output voltage is supplied; and after a predetermined time elapses from a time point at which the program enable signal is activated in the activation period of the enable signal, the charge-pump enable signal is activated.

14. A voltage regulator comprising:

a voltage generator configured to receive a reference voltage and a feedback voltage and configured to generate an output voltage corresponding to the feedback voltage;

a voltage divider configured to divide the output voltage to generate the feedback voltage; and a controller configured to control a voltage division value of the voltage divider in response to a program enable signal and a charge-pump enable signal during an activation period of an enable signal, wherein the feedback voltage is changed according to the voltage division value so that the output voltage increases to a predetermined target level or higher during a first period and then sequentially decreases during a second period after the first period elapses.

15. The voltage regulator according to claim 14, wherein:

the program enable signal and the charge-pump enable signal are activated in a program mode of a load to which the output voltage is supplied; and after a predetermined time elapses from a time point at which the program enable signal is activated in the activation period of the enable signal, the charge-pump enable signal is activated.

16. The voltage regulator according to claim 14, wherein the voltage generator includes:

an amplifier configured to compare the reference voltage with the feedback voltage, amplify a voltage based on difference between the reference voltage and the feedback voltage, and output the amplified voltage;

a buffer configured to supply a driving voltage in response to the amplified voltage; and a driver configured to adjust a level of the output voltage in response to the driving voltage.

17. The voltage regulator according to claim 14, wherein the controller includes:

a voltage controller configured to generate a plurality of control signals for controlling the voltage division value of the voltage divider in response to the program enable signal and the charge-pump enable signal during the activation period of the enable signal; and a switching circuit configured to adjust a resistance value of the voltage divider in response to the plurality of control signals.

18. The voltage regulator according to claim 17, wherein the voltage controller includes:

a plurality of rising delay circuits configured to respectively generate a plurality of rising delay signals having different delay times by delaying a rising edge signal of the charge-pump enable signal;

a plurality of selectors configured to select any one of the program enable signal and the plurality of rising delay signals in response to the charge-pump enable signal and configured to respectively output a plurality of pulse input signals;

a plurality of pulse generators configured to respectively generate a plurality of pulse signals in response to the plurality of pulse input signals;

a delay circuit configured to generate a delay signal by delaying the program enable signal for a predetermined time; and a control signal generator configured to generate the plurality of control signals in response to the enable signal, the program enable signal, the delay signal, and the plurality of pulse signals.

19. The voltage regulator according to claim 17, wherein:

the voltage divider includes a plurality of resistors connected in series between an output terminal of the output voltage and a ground voltage terminal, and the switching circuit includes a plurality of switching elements respectively connected in parallel to some of the plurality of resistors so that switching operations of the switching elements are controlled by the plurality of control signals, wherein, after a predetermined delay time elapses from a time point at which the charge-pump enable signal is activated, the plurality of switching elements is sequentially turned off in response to the plurality of control signals.

* * * * *